United States Patent
Pesson et al.

(10) Patent No.: US 8,210,705 B2
(45) Date of Patent: Jul. 3, 2012

(54) TOUCH-SENSITIVE LIGHTED HAND RAIL

(75) Inventors: Renaldo C. Pesson, Jersey City, NJ (US); Nicholas J. Watkins, New York, NY (US)

(73) Assignee: HOK Product Design, LLC, Culver City, CA (US)

( * ) Notice: Subject to any disclaimer, the term of this patent is extended or adjusted under 35 U.S.C. 154(b) by 83 days.

(21) Appl. No.: 12/751,007

(22) Filed: Mar. 31, 2010

(65) Prior Publication Data
US 2010/0315023 A1    Dec. 16, 2010

Related U.S. Application Data

(60) Provisional application No. 61/187,376, filed on Jun. 16, 2009.

(51) Int. Cl.
*F21S 8/00* (2006.01)
*F21V 23/04* (2006.01)

(52) U.S. Cl. ............... 362/146; 362/276; 362/802

(58) Field of Classification Search ........... 362/145, 362/146, 276, 802; 16/903
See application file for complete search history.

(56) References Cited

U.S. PATENT DOCUMENTS

| | | | | |
|---|---|---|---|---|
| 5,099,402 A * | 3/1992 | Starniri | ............ | 362/146 |
| 5,450,299 A * | 9/1995 | Lepre | ............ | 362/145 |
| 5,779,228 A * | 7/1998 | Hansen | ............ | 256/65.05 |
| 6,065,852 A * | 5/2000 | Crumley | ............ | 362/146 |
| 6,135,621 A * | 10/2000 | Bach et al. | ............ | 362/399 |
| 7,168,843 B2 * | 1/2007 | Striebel | ............ | 362/652 |
| 8,002,426 B2 * | 8/2011 | Pearson et al. | ............ | 362/152 |
| 2008/0080173 A1 * | 4/2008 | Trimble et al. | ............ | 362/146 |

* cited by examiner

*Primary Examiner* — Stephen F. Husar
*Assistant Examiner* — Peggy A. Neils
(74) *Attorney, Agent, or Firm* — Bryan W. Bockhop; Bockhop & Associates, LLC

(57) ABSTRACT

A wall mounted hand rail system for assisting a patient includes a support beam. A plurality of lighting elements is disposed adjacent a bottom portion of the support beam and is configured selectively to direct light in a downward direction. An electronic system is configured to sense when the support beam has been touched by the patient and is configured to cause the lighting elements to illuminate an area below the support beam when the support beam has been touched by the patient.

12 Claims, 4 Drawing Sheets

TOUCH-SENSITIVE LIGHTED HAND RAIL

CROSS-REFERENCE TO RELATED APPLICATION(S)

This application claims the benefit of U.S. Provisional Patent Application Ser. No. 61/187,376, filed Jun. 16, 2009, the entirety of which is hereby incorporated herein by reference.

BACKGROUND OF THE INVENTION

1. Field of the Invention

The present invention relates to hand rail systems and, more specifically, to a hand rail system that provides light when touched.

2. Description of the Prior Art

Falling is a common problem with patients in the hospital, nursing home and other health care environments. For example, patients who get out of their beds sometimes become unsteady and fall. The consequences of a fall can be debilitating to the patient and can be extremely costly to the health care facility.

Many health care facilities employ hand rails affixed to the wall of a patient care area to help steady patients as they move about. Thus, a patient can get out of bed by grabbing the hand rail and walk while holding on to a hand rail. The constant guidance of the hand rail greatly reduces the likelihood of the patient falling.

At night the patient's room is usually dark to facilitate sleeping. Because the room is dark, the patient may have difficulty seeing the hand rail, the floor and any hazards on the floor that increase the likelihood of tripping or falling. Leaving the lights on all night would solve this problem; however, it could also interfere with the patient's sleep.

Most falls occur in the patient bedroom, followed by the bathroom. Transfers to and from bed may account for 42.2% of falls at or near the bedside, while toileting may account for 16.1% of falls. For individuals 65 and older, the rate of falls reaches 1.5 per hospital bed annually. Daytime sleep accounts for 50% of acute care patients' total sleep time. Yet, harsh light sources can cause sleep arousals and awakenings during day and night-time sleep when light should be dimmer. It is projected the annual cost of fall injuries among older people in 2020 will escalate to $32.4 billion (not adjusting for changes to the U.S. dollar since 1994). Individual fall expenses often vary between approximately $1,000 and $20,000 per fall. Effective design interventions are necessary to help reduce nursing days lost due to back injuries caused by assisting patients to and from bathrooms.

Therefore, there is a need for a hand rail that causes the floor to be lighted whenever the patient uses the hand rail, but that is dark when not in use.

SUMMARY OF THE INVENTION

The disadvantages of the prior art are overcome by the present invention which, in one aspect, is a wall mounted hand rail system for assisting a patient that includes a support beam. A plurality of lighting elements is disposed adjacent a bottom portion of the support beam and is configured selectively to direct light in a downward direction. An electronic system is configured to sense when the support beam has been touched by the patient and is configured to cause the lighting elements to illuminate an area below the support beam when the support beam has been touched by the patient.

In another aspect, the invention is a hand rail system for assisting a patient that includes a support beam having a conductive outer surface. A plurality of light emitting diodes is disposed adjacent a bottom portion of the support beam and is configured selectively to direct light in a downward direction. An electronic system is configured to sense when the support beam has been touched by the patient and is configured to cause the light emitting diodes to illuminate an area below the support beam when the support beam has been touched by the patient. The electronic system includes a touch sensor circuit that is configured to sense when the conductive outer surface has been touched, a switch that is configured to couple the lighting elements to a power source when the touch sensor has sensed that the conductive outer surface has been touched and a timing circuit that is configured to start a timer when the conductive outer surface has been touched and wherein the switch is responsive to the timer and is further configured to continue to couple the lighting elements to the power source until the timer indicates that a predetermined amount of time has passed since the conductive outer surface was touched.

In yet another aspect, the invention is a room, including a wall. A support beam is affixed to the wall so that the support beam is at an elevation to facilitate supporting a person grasping the support beam. A plurality of lighting elements is disposed adjacent a bottom portion of the support beam and is configured selectively to direct light in a downward direction. An electronic system is configured to sense when the support beam has been touched by the patient and is configured to cause the lighting elements to illuminate an area below the support beam when the support beam has been touched by the patient.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
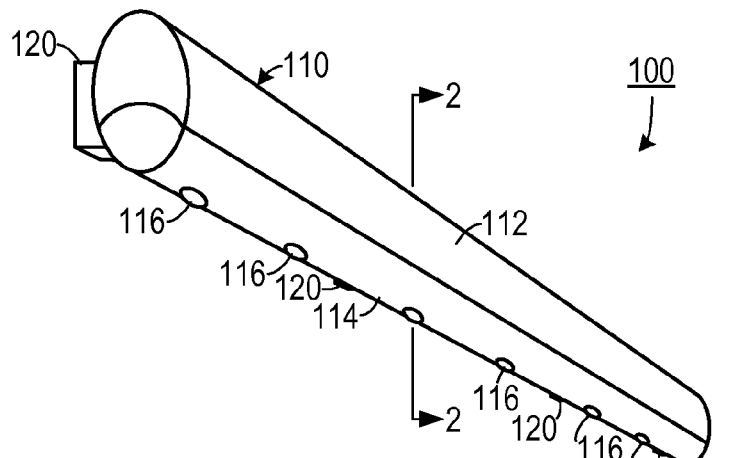
FIG. 1A is a perspective view of a first embodiment.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1B:
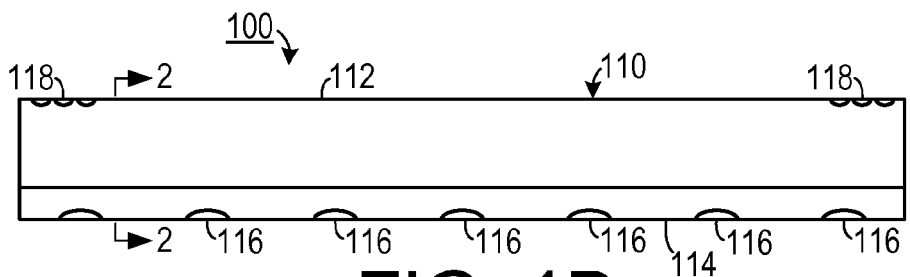
FIG. 1B is an elevational view of the embodiment shown in FIG. 1A.

As shown in FIG. 1, one embodiment is a selectively illuminated hand rail 100 that includes a support beam 110, configured to provide a patient with support, and a plurality of wall mounts 120 for securing the support beam 110 to a wall. The hand rail 100 is placed at a height that would be typical for supporting patients in, for example, a hospital room, a restroom, a nursing home or any environment where a person would use a handrail for support. The support beam 110 includes an unlighted patient support member 112 and a light member 114. The unlighted patient support member 112 may be made of one of many materials that could be employed in a hand rail, including metal, plastic, wood, etc. In one embodiment, it can include an anti-microbial material or an anti-microbial coating. The light member 114 has embedded therein a plurality of downwardly pointing lighting elements 116, such a light emitting diodes. (However, it is understood that other types of lighting elements, such as incandescent bulbs and fluorescent lights could be employed without departing from the scope of the invention.)

One or more lights 118 may also be placed adjacent the ends of the patient support member 112 to provide guidance to the patient as to where to grab. In one embodiment, these lights 118 are relatively dim lights, such as light emitting diodes, that are left on permanently. Also, these lights 118 may also face upwardly (as shown) or, alternatively, may face outwardly from the ends of the patient support member 112 or the light member 114.

Figure 2:
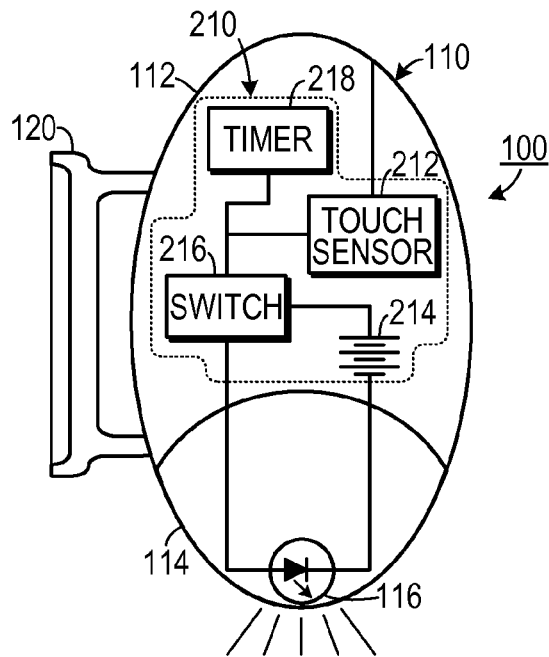
FIG. 2 is a cross-sectional schematic view of the embodiment shown in FIG. 1B, taken along line 2-2.

As shown in FIG. 2, a touch-sensitive electronic element 210 is embedded in the hand rail 100. In one representative embodiment, the touch-sensitive electronic element 210 includes a touch sensor 212 (such as a capacitive touch sensor, a pressure sensor, or one of the many types of touch sensors known to those of skill in the electronic arts), a switch 216 that is responsive to the touch sensor 212 and a power source 214 (which could be, e.g., hard wired to a low voltage DC power source or which could be a battery). When the touch sensor 212 senses that someone has touched the hand rail 100, the touch sensor 212 causes the switch 216 to supply power to the lighting elements 116, thereby illuminating the floor. A timer 218 may also be activated by the touch sensor 212, causing the switch 216 to stay in a "on" state for a predetermined amount of time after the touch sensor 212 senses the touching, thereby preventing the lighting elements 116 from blinking off during brief periods when the patient's hand is removed from the hand rail 100. As will be readily apparent to those of skill in the art, the configuration of the touch-sensitive electronic element 210 shown in FIG. 2 is one of many different touch switch systems that may be employed within the scope of the invention. Such systems could include, for example, programmable logic arrays or microprocessors to achieve the desired lighting timing.

Figure 3A:
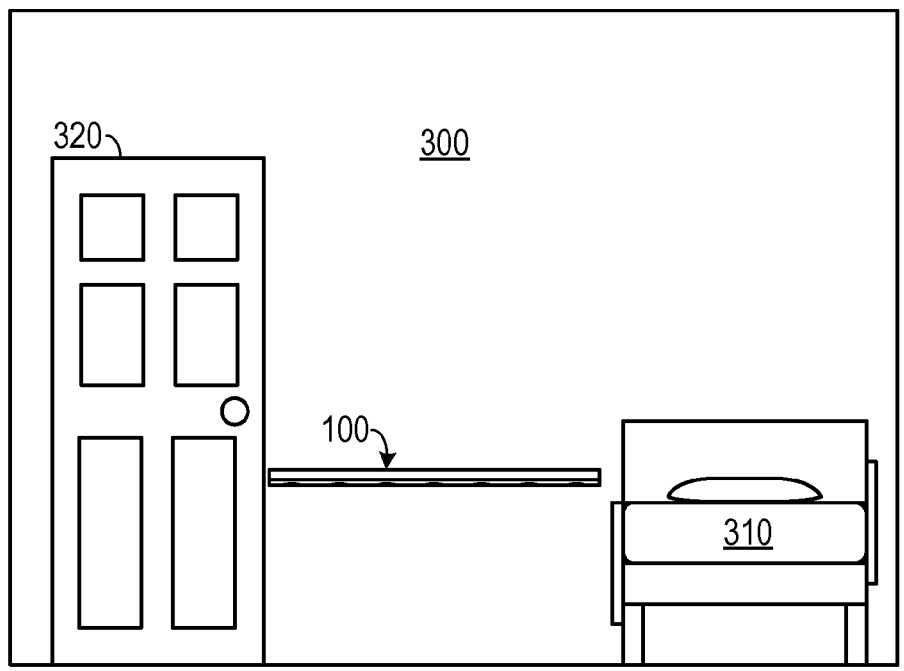
FIG. 3A is an elevational view of an embodiment employed in a patient room while in a dormant state.
Figure 3B:
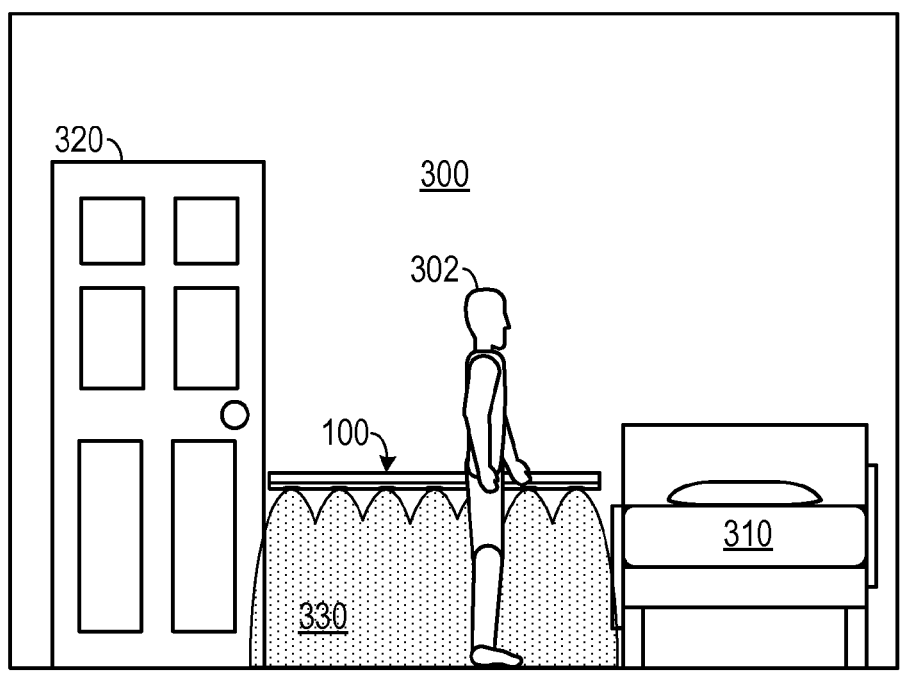
FIG. 3B is an elevational view of an embodiment employed in a patient room while in an active state.

As shown in FIG. 3A, the hand rail 100 may be employed in a patient care room 300 to provide a patient with support and guidance from a bed 310 to a restroom 320. In this example, since no one is touching the hand rail 100 in FIG. 3A, the lighting elements are off. However, as shown in FIG. 3B, a patient 302 touching the hand rail 100 causes the lighting elements to illuminate that area 330 under the hand rail 100, thereby providing the patient 302 with greater stability and confidence, while lessening the potential for the patient 302 to slip, trip or fall.

Figure 4:
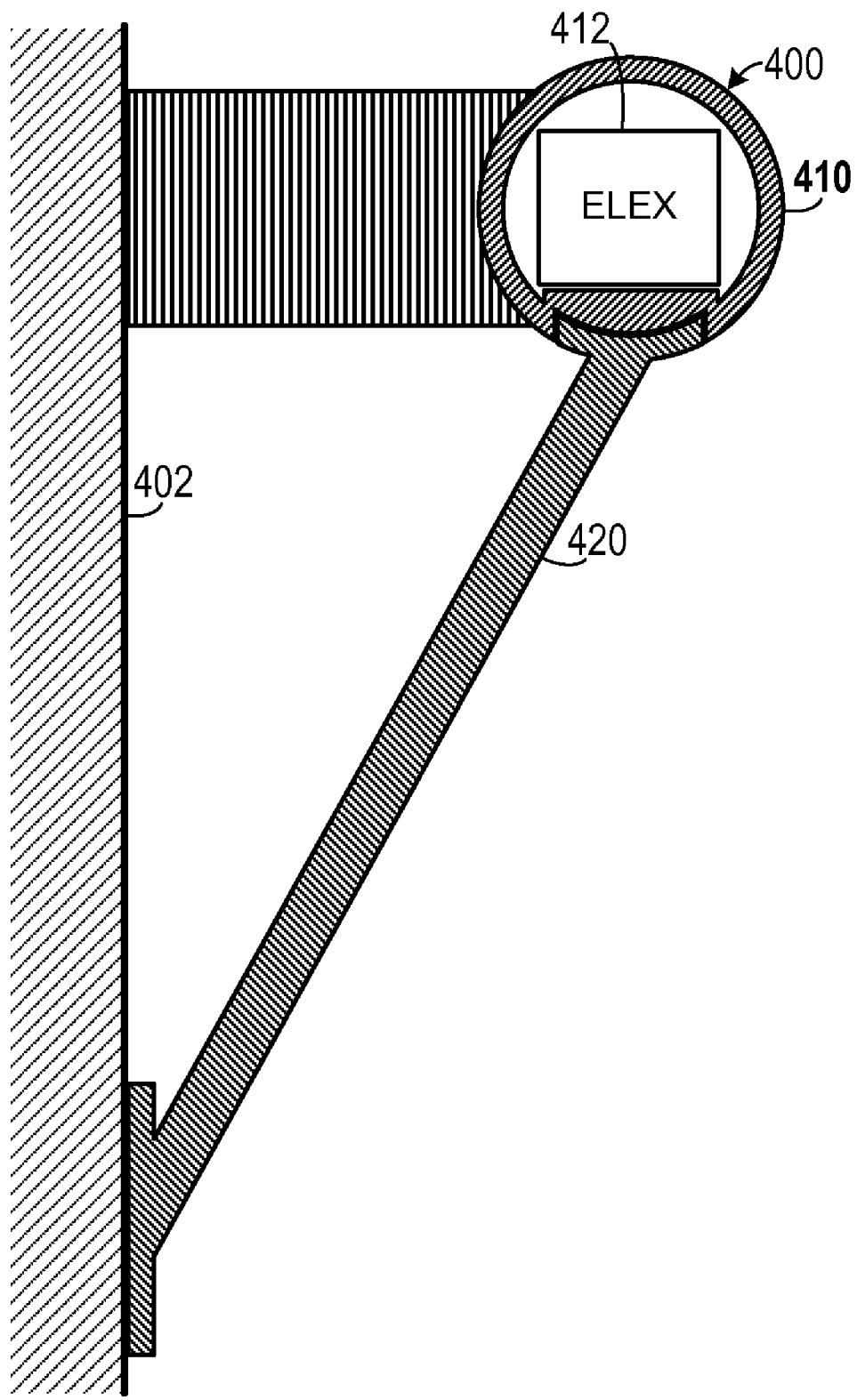
FIG. 4 is a cross-sectional view of a second embodiment.

One example of a system 400 including a hand rail 410 mounted on a wall 402 is shown in FIG. 4. In this embodiment, the electronic circuits 412 used to control the lighting are contained within the hand rail 410. This example also employs a strut 420 to provide added vertical support to the hand rail 410. In other embodiments, the hand rail and its mounting elements can be built of materials of sufficient strength so as not to employ a strut.

Figure 5:
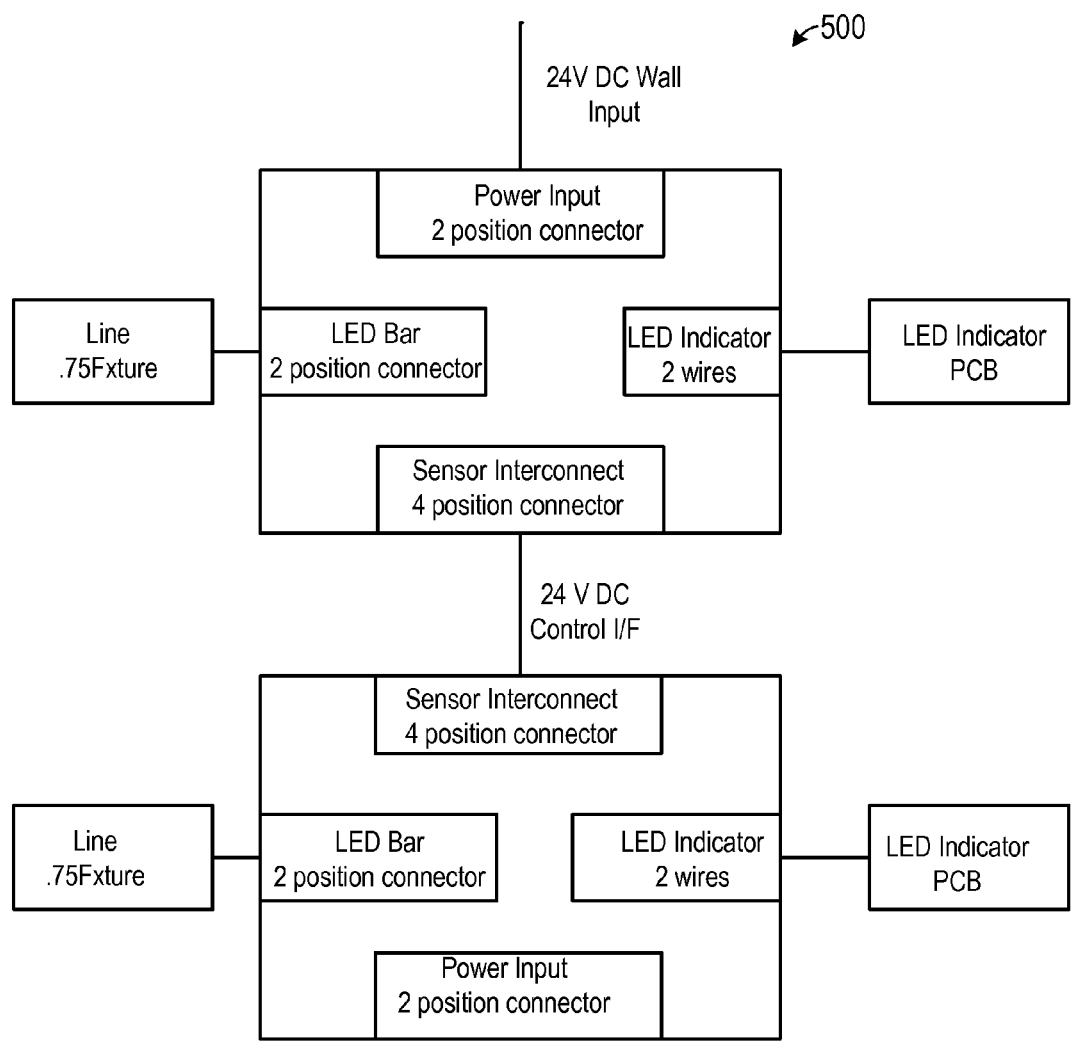
FIG. 5 is an electrical schematic diagram of a device employed in one embodiment.

An example of an electrical device 500 employed in one embodiment is shown in FIG. 5. This embodiment is powered by a 24 V DC wall input to power light emitting diodes (LEDs) through a printed circuit board.

This device lessens the potential for physical injury, adverse psychological effects, extended hospital stays, litigation, and even fatality because many patient falls occur at night or during dim conditions. Also, many falls occur while an unassisted patient is walking or getting out of bed to go to the bathroom. An added advantage is that the invention provides a visual cue to healthcare staff of when a patient is attempting to exit the bed and moving to or from the bathroom without assistance.

One embodiment facilitates the relationship between patient bed and the bathroom in a typical patient room afforded by a canted headwall. Inboard bathrooms (near the corridor) and near the patient bed allow the staff to easily view the patient from the hallway during nursing rounds. The bathroom arrangement gives patients a wider view to the outdoors and closer proximity to the bathroom. The above-disclosed device would complete this or any other patient bedroom design ensemble by offering the peace of mind afforded by a clear and reliable means to egress a bed or access a bathroom during dim conditions either night or day. The avoidance of litigation resulting from a single injury and/or trauma to a patient could likely outweigh the cost of outfitting an entire facility.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A wall mounted hand rail system for assisting a patient, comprising:
   a. a support beam;
   b. a plurality of at least three spaced apart light emitting diodes disposed adjacent a bottom portion of the support beam and configured selectively to direct light in a downward direction;
   c. an electronic system configured to sense when the support beam has been touched by the patient and configured to cause the light emitting diodes to illuminate an area below the support beam when the support beam has been touched by the patient; and
   d. at least one light emitting diode disposed adjacent each end of the support beam to provide guidance to the patient as to where to grab the hand rail system.

2. The system of claim 1, wherein the support beam includes a conductive outer surface and wherein electronic system comprises:
   a. a touch sensor circuit configured to sense when the conductive outer surface has been touched; and
   b. a switch that is configured to couple the light emitting diodes to a power source when the touch sensor has sensed that the conductive outer surface has been touched.

3. The system of claim 2, wherein the electronic system further comprises a timing circuit that is configured to start a timer when the conductive outer surface has been touched and wherein the switch is responsive to the timer and is further configured to continue to couple the light emitting diodes to the power source until the timer indicates that a predetermined amount of time has passed since the conductive outer surface was touched.

4. The system of claim 1, further comprising a plurality of wall mounts configured to secure the hand rail system to the wall.

5. A hand rail system for assisting a patient, comprising:
 a. a support beam having a conductive outer surface;
 b. a plurality of at least three spaced apart light emitting diodes disposed adjacent a bottom portion of the support beam and configured selectively to direct light in a downward direction; and
 c. an electronic system configured to sense when the support beam has been touched by the patient and configured to cause the light emitting diodes to illuminate an area below the support beam when the support beam has been touched by the patient, the electronic system including:
  i. a touch sensor circuit configured to sense when the conductive outer surface has been touched;
  ii. a switch that is configured to couple the light emitting diodes to a power source when the touch sensor has sensed that the conductive outer surface has been touched; and
  iii. a timing circuit that is configured to start a timer when the conductive outer surface has been touched and wherein the switch is responsive to the timer and is further configured to continue to couple the light emitting diodes to the power source until the timer indicates that a predetermined amount of time has passed since the conductive outer surface was touched; and
 d. at least one light emitting diode disposed adjacent each end of the support beam to provide guidance to the patient as to where to grab the hand rail system.

6. The system of claim 5, further comprising a plurality of wall mounts configured to secure the hand rail system to a wall.

7. A room, comprising:
a wall;
 a. a support beam affixed to the wall so that the support beam is at an elevation to facilitate supporting a person grasping the support beam;
 b. a plurality of at least three spaced apart light emitting diodes disposed adjacent a bottom portion of the support beam and configured selectively to direct light in a downward direction; and
 c. an electronic system configured to sense when the support beam has been touched by the patient and configured to cause the light emitting diodes to illuminate an area below the support beam when the support beam has been touched by the patient; and
 d. at least one light emitting diode disposed adjacent each end of the support beam to provide guidance to the patient as to where to grab the hand rail system.

8. The room of claim 7, wherein the support beam runs from a sleeping area to a door.

9. The room of claim 7, wherein the support beam runs from a sleeping area to a restroom.

10. The room of claim 7, wherein the support beam includes a conductive outer surface and wherein electronic system comprises:
 a. a touch sensor circuit configured to sense when the conductive outer surface has been touched; and
 b. a switch that is configured to couple the light emitting diodes to a power source when the touch sensor has sensed that the conductive outer surface has been touched.

11. The room of claim 10, wherein the electronic system further comprises a timing circuit that is configured to start a timer when the conductive outer surface has been touched and wherein the switch is responsive to the timer and is further configured to continue to couple the light emitting diodes to the power source until the timer indicates that a predetermined amount of time has passed since the conductive outer surface was touched.

12. The room of claim 7, further comprising a plurality of wall mounts configured to secure the hand rail system to the wall.

* * * * *